US012041117B2

(12) United States Patent
Karin et al.

(10) Patent No.: US 12,041,117 B2
(45) Date of Patent: *Jul. 16, 2024

(54) PREDICTIVE MODEL APPLICATION FOR FILE UPLOAD BLOCKING DETERMINATIONS

(71) Applicant: Microsoft Technology Licensing, LLC, Redmond, WA (US)

(72) Inventors: Omer Karin, Tel Aviv (IL); Josef Weizman, Haifa (IL); Ram Haim Pliskin, Rishon Lezion (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,887

(22) Filed: Sep. 21, 2022

(65) Prior Publication Data

US 2023/0025488 A1    Jan. 26, 2023

Related U.S. Application Data

(63) Continuation of application No. 16/907,004, filed on Jun. 19, 2020, now Pat. No. 11,483,375.

(51) Int. Cl.
*H04L 67/06* (2022.01)
*G06F 16/13* (2019.01)
(Continued)

(52) U.S. Cl.
CPC ............. *H04L 67/06* (2013.01); *G06F 16/13* (2019.01); *G06F 16/955* (2019.01);
(Continued)

(58) Field of Classification Search
CPC ......... H04L 67/06; H04L 12/66; G06F 16/13; G06F 16/955; G06F 18/214;
(Continued)

(56) References Cited

U.S. PATENT DOCUMENTS 9,805,042 B1 *  10/2017  Meyer .................... G06F 16/16
9,852,377 B1 *  12/2017  Kumar .................... G06N 5/04
(Continued)

FOREIGN PATENT DOCUMENTS

WO    WO-2015122874 A1 *  8/2015  ......... H04L 12/1886

OTHER PUBLICATIONS

Communication under Rule 71(3) EPC Received for European Application No. 21729744.9, mailed on Feb. 5, 2024, 08 pages.

*Primary Examiner* — Austin J Moreau
(74) *Attorney, Agent, or Firm* — Mannava & Kang, P.C.

(57) ABSTRACT

According to examples, an apparatus may include a memory on which is stored machine-readable instructions that may cause a processor to receive a request to upload a file to a directory and determine whether the request is a request to upload a predefined type of file to the directory. In addition, based on a determination that the request is a request to upload the predefined type of file to the directory, the processor may determine, through application of a predictive model, whether the directory is a user content directory and based on a determination that the application of the predictive model indicates that the directory is a user content directory, block the request and/or output a notification regarding the receipt of the request.

20 Claims, 4 Drawing Sheets

(51) Int. Cl.
*G06F 16/955* (2019.01)
*G06F 18/214* (2023.01)
*G06N 5/04* (2023.01)
*G06N 20/00* (2019.01)
*H04L 12/66* (2006.01)

(52) U.S. Cl.
CPC ............. *G06F 18/214* (2023.01); *G06N 5/04* (2013.01); *G06N 20/00* (2019.01); *H04L 12/66* (2013.01)

(58) Field of Classification Search
CPC ...... G06F 21/316; G06F 21/51; G06F 21/554; G06N 5/04; G06N 20/00
See application file for complete search history.

(56) References Cited

U.S. PATENT DOCUMENTS

| | | | |
|---|---|---|---|
| 2014/0032505 A1* | 1/2014 | Grafi | G06F 16/116 707/691 |
| 2016/0021056 A1 | 1/2016 | Chesla | |
| 2016/0057166 A1* | 2/2016 | Chesla | H04L 63/1416 726/22 |
| 2017/0264640 A1* | 9/2017 | Narayanaswamy | G06F 16/285 |
| 2019/0174319 A1* | 6/2019 | Backholm | H04L 63/0281 |
| 2020/0302058 A1* | 9/2020 | Kenyon | G06F 21/554 |
| 2021/0004472 A1* | 1/2021 | Almeida | G06F 21/602 |

\* cited by examiner

PREDICTIVE MODEL APPLICATION FOR FILE UPLOAD BLOCKING DETERMINATIONS

PRIORITY CLAIM

This application is a Continuation of commonly assigned and co-pending U.S. patent application Ser. No. 16/907,004, filed Jun. 19, 2020, entitled "PREDICTIVE MODEL APPLICATION FOR FILE UPLOAD BLOCKING DETERMINATIONS", the disclosure of which is hereby incorporated by reference in its entirety.

BACKGROUND

A vast number of websites offer directories to which users may upload various types of files via the Internet. The users may upload the files to the directories for storage purposes, for security purposes, and/or to share the files with other users. In some instances, the directories may be susceptible to arbitrary file upload attacks, in which a malicious user may upload a file containing server-side executable code to a directory. In these types of attacks, on access to the file, a server may run the content of the server-side executable code, which may include malicious code or a backdoor code and may expose the server to attack.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
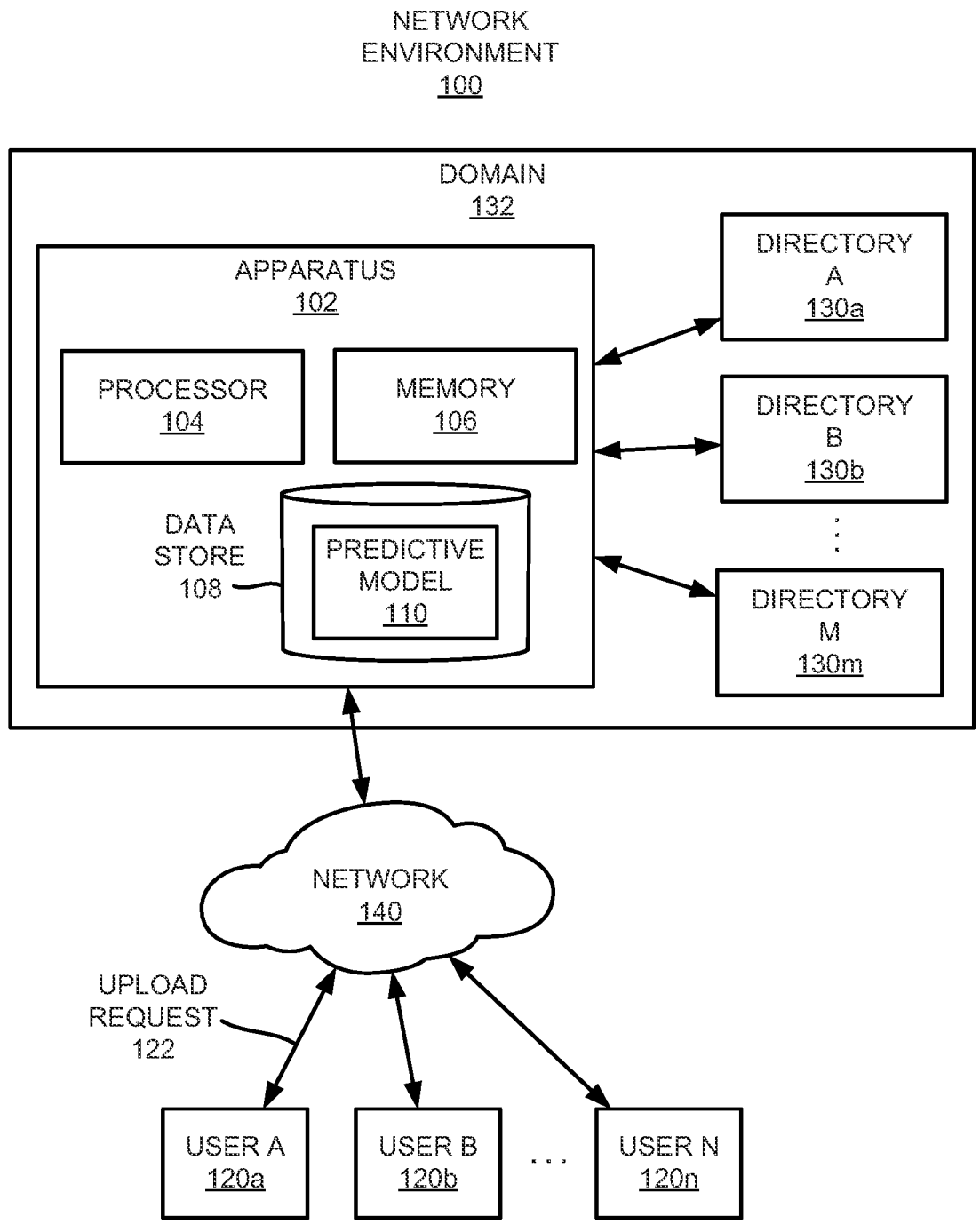
FIG. 1 shows a block diagram of a network environment, in which an apparatus may determine whether or not to block a request to upload a file of a predefined type based on application of a predictive model that indicates whether a directory is a user content directory, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

As discussed above, directories that receive user content uploads may be susceptible to attacks, such as arbitrary file upload attacks. In some instances, the directories that typically receive user content uploads may be known and those directories may be monitored for possible malicious upload requests. However, in many instances, the determinations as to whether the directories typically receive user content uploads, e.g., non-executable files, may not be made a priori because, for instance, of the relatively large number of directories available to users for the uploading of various types of files. In other instances, the directories may simply not be identified as being intended for receipt of user content or for receipt of executable files. Without such information about the directories, it may be difficult to discern between directories that are to receive executable files from those that are not to receive executable files. As a result, potentially malicious files may be uploaded to user content directories, which may expose servers associated with the user content directories to attack, such as an arbitrary file upload attack.

Disclosed herein are systems, apparatuses, methods, and computer-readable media in which a processor may reduce or prevent attacks deployed through user content directories. That is, the processor may determine whether a directory is a user content directory and based on a determination that a directory is a user content directory, may block the upload of a predefined type of file to the directory. For instance, the processor may block the upload of an executable file, e.g., a file containing server-side executable code, to a directory that the processor has determined as being a user content directory. A technical issue discussed above is that directories may be susceptible to malicious users, such as through arbitrary file attacks. A technical solution afforded by the present disclosure may be that directories, and thus, the servers upon which the directories may be hosted, may be protected against such attacks.

As discussed herein, the processor may apply a predictive model that may be used to classify directories as being to receive a predefined type of file from users or not being to receive the predefined type of file from users. The predictive model may be generated through input of a training set of data into a machine learning operation, in which the training set of data may include data pertaining to user uploads of multiple types of files to multiple types of directories. In addition, the processor may input features or characteristics of a directory into the predictive model and the predictive model may predict whether the directory is likely a user content directory or not. The processor may also determine whether a requested file upload is to be permitted or not based on the prediction.

Figure 2:
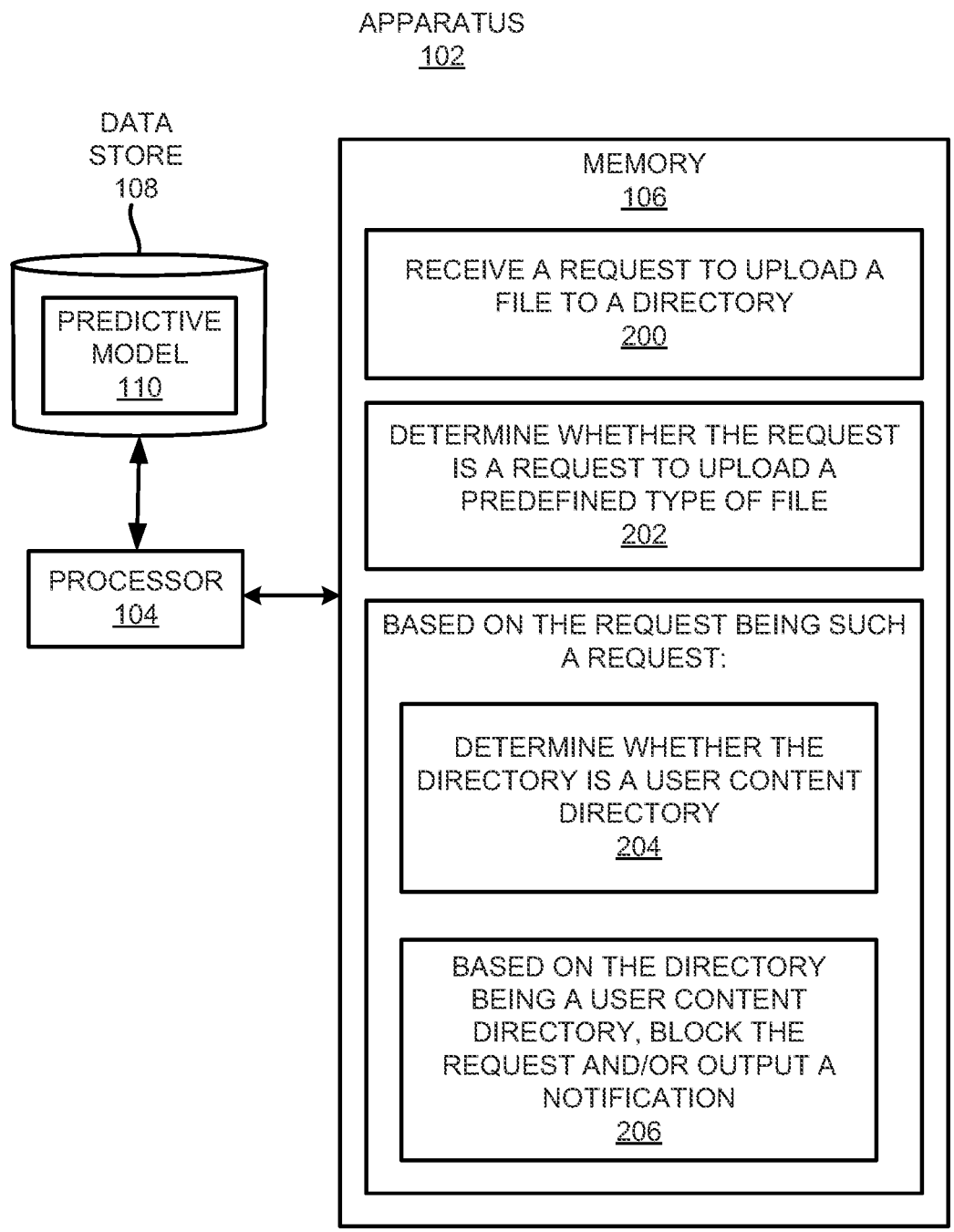
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may determine whether or not to block a request to upload a file of a predefined type based on application of a predictive model that indicates whether a directory is a user content directory, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 of the network environment 100 may include additional features and that some of the features described herein may be removed and/or modified without departing from the scopes of the network environment 100 and/or the apparatus 102.

As shown in FIG. 1, the network environment 100 may include the apparatus 102, a plurality of users 120a-120n, directories 130a-130m, and a network 140. According to examples, the apparatus 102 may be a server or other type of computing device, e.g., a network gateway, an access point, or the like, that may provide security services (as well as other services) to the directories 130a-130m, in which the variable "m" may represent a value greater than one. In some examples, each of the users 120a-120n, in which the variable "n" may represent a value greater than one, may submit requests to upload files via a computing device, such as a personal computer, a laptop computer, a tablet computer, a smartphone, a handheld scanning device, or the like.

According to examples, some or all of the directories 130a-130m may each include a uniform resource locator, a folder, and/or the like. In addition, some or all of the directories 130a-130m may be web sites or other online services to which the users 120a-120n may upload files. Some of the files may include executable files, which may include files that include executable code, executable programs, or the like, may be defined as files that include encoded instructions that, when executed, may cause a computer or a server to perform indicated tasks. Alternatively, some of the files may include non-executable files, which may include data files that do not include encoded instructions. Examples of data files may include image files, video files, document files, and/or the like.

As further shown in FIG. 1, each of the users 120a-120n may upload requests 122 to upload files to the directories 130a-130m to the apparatus 102 via a network 140, which may be any suitable type of network through which the users 120a-120n, e.g., the computing devices used by the users 120a-120n, and the apparatus 102 may communicate with each other, such as the Internet, a wide area network, a local area network, and/or the like. In addition, the apparatus 102 and the directories 130a-130m may be part of a common network, e.g., may be part of a common domain 132, may be components within a common firewall, and/or the like.

As shown in FIGS. 1 and 2, the apparatus 102 may include a processor 104, and memory 106, and a data store 108. The data store 108 may be a Random Access memory (RAM), an Electrically Erasable Programmable Read-Only Memory (EEPROM), a storage device, or the like. The data store 108 may have stored thereon a predictive model 110 that may be used to classify directories as user content directories that are to receive certain types of files while not receiving other types of files. The predictive model 110 may be in the form of an equation, a set of equations, or may have another suitable form. In some examples, the processor 104 may generate the predictive model 110 through implementation of a machine learning operation on a training set of data, in which the training set of data may include data pertaining to user uploads of multiple types of files to directories. In other examples, another processor or device (not shown) may generate the predictive model 110.

As discussed herein, the apparatus 102, and more particularly, the processor 104, may control whether the upload requests 122 are fulfilled or denied using the predictive model 110. In one regard, the apparatus 102 may operate to provide security to the directories 130a-130m, for instance, by controlling the permission and denial of user uploaded files to the directories 130a-130b. That is, the apparatus 102 may block the upload of certain types of files to certain directories in instances in which the files may potentially expose those directories and/or the components within the domain 132 to attacks, such as arbitrary file upload attacks, denial of service attacks, phishing attacks, and/or the like. Particularly, the apparatus 102 may apply the predictive model 110 on a directory 130a to determine whether the particular directory 130a is a user content directory.

Generally speaking, a user content directory may be directory upon which users normally upload non-executable files and thus normally does not receive a predefined type of file, e.g., an executable file, a particular type of executable file, or the like. Based on a determination that the particular directory 130a is a user content directory and thus does not normally receive the predefined type of file, the apparatus 102 may take an action to block the upload of the file to the particular directory 130a and/or may output a notification regarding the potential attack.

The processor 104 may control operations of the apparatus 102 and the memory 106 may store data that the processor 104 may access and/or may execute. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-206 that the processor 104 may execute. Although the instructions 200-206 are described herein as being stored on the memory 106 and may thus include a set of machine-readable instructions, the apparatus 102 may include hardware logic blocks that may perform functions similar to the instructions 200-206. For instance, the processor 104 may include hardware components that may execute the instructions 200-206. In other examples, the apparatus 102 may include a combination of instructions and hardware logic blocks to implement or execute functions corresponding to the instructions 200-206. In any of these examples, the processor 104 may implement the hardware logic blocks and/or execute the instructions 200-206. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to receive a request 122 to upload a file to a directory 130a. As shown in FIG. 1, the processor 104 may receive the file upload request 122 from a user 120a (e.g., a client device) via the network 140. The upload request 122 may include information identifying the directory 130a, e.g., an IP address, URL, or the like, of the directory 130a. The upload request 122 may also include the file that is being requested to be uploaded.

The processor 104 may execute the instructions 202 to determine whether the upload request 122 is a request to upload a predefined type of file to the directory 130a. That is, for instance, the processor 104 may analyze the file that is requested to be uploaded to determine whether the file is the predefined type. By way of example, the processor 104 may determine whether the file includes executable code, e.g., whether the file is an executable file, a particular type of executable file, a file including server-side executable code, and/or the like. The processor 104 may make this determination based on, for instance, the name of the file, an extension of the file name, and/or the like.

Based on a determination that the request is a request to upload a file that is not of the predefined type, the processor 104 may permit the upload request 122 to be fulfilled and thus permit the file to be uploaded to the directory 130a. That is, for instance, based on a determination that the file in the upload request 122 is not an executable file, e.g., does not include server-side executable code, the processor 104 may permit the upload request 122.

However, based on a determination that the request is a request to upload the predefined type of file to the directory 130a, the processor 104 may execute the instructions 204 to determine, through application of the predictive model 110, whether the directory 130a is a user content directory. A user content directory may be a directory to which users 120a-120n may normally upload certain types of files such as data files, image files, video files, document files, and/or the like. In other words, a user content directory may be a directory to which users 120a-120n do not normally or ever upload executable files, e.g., files containing server side executable code. In some instances, the processor 104 may not have determined a priori as to whether the directory 130a is a user content directory or not (e.g., is to receive the predefined type of file or not). As the domain 132 or other collection of directories may include a large number of directories 130a-130m, e.g., hundreds or thousands of directories, and/or as new directories may continue to be added, it may be impractical or infeasible for the processor 104 to determine a priori whether each of the directories 130a-130m normally receives the predefined type of file or not. In other words, it may be impractical or infeasible for the processor 104 to determine a priori whether each of the directories 130a-130m is a user content directory.

As discussed herein, the predictive model 110 may be used to classify a directory 130a as being a user content directory or not. In other words, the predictive model 110 may classify the directory 130a as being to, e.g., being designated to, being set up to, or the like, receive a predefined type of file from users 120a-120n or not. That is, for instance, the predictive model 110 may identify features or characteristics of the directory 130a and may input the identified features or characteristics into the predictive model. The features or characteristics of the directory 130a may include, for instance, a label, an identifier, a URL, or the like, of the directory 130a. In some examples, the processor 104 may generate the predictive model 110 through implementation of a machine learning operation on a training set of data, in which the training set of data includes data pertaining to user uploads of multiple types of files to directories. In other examples, the predictive model 110 may have previously been generated and stored in the data store 108 and the processor 104 may access the predictive model 110 from the data store 108.

The processor 104 may apply the predictive model 110 on the inputted features or characteristics to determine whether the directory 130a is a user content directory is thus not to receive the predefined type of file, e.g., a file including server-side executable code, from users 120a-120n. That is, the processor 104 may determine whether the predictive model 110 predicts, based on the inputted features or characteristics, whether there is a higher probability that the directory 130a is a user content directory or that the directory 130a is to receive the predefined type of file. For example, user content directories may typically include words or word combinations that are indicative of their purpose, for example, photos, videos, user playlists, or the like, and thus, the predictive model 110 may predict that a directory 130a has high probability of being a user content director based on the directory 130a having certain words.

In addition, based on a determination that the application of the predictive model 110 indicates that the directory 130a is a user content directory, the processor 104 may execute the instructions 206 to block the request and/or output a notification regarding the receipt of the request. In other words, based on a determination by the processor 104 through application of the predictive model 110 that the directory 130a is a user content directory, the processor 104 may block the upload of the file in the request to the directory 130a. The processor 104 may thus prevent the file, which may include server-side executable code, from being uploaded to the directory 130a.

In addition, or alternatively, the processor 104 may output a notification that indicates that a request to upload a predefined type of file to the directory 130a has been received. In other words, the notification may indicate that a request to upload an executable file, e.g., a file including server-side executable code, to a user content directory has been received. The processor 104 may output the notification to the user 120a that submitted the upload request 122 along with, for instance, an error message to notify the user 120a that the upload request 122 has been denied. The processor 104 may additionally or alternatively output the notification to an administrator, a log, and/or the like.

However, based on a determination that the application of the predictive model 110 indicates that the directory 130a is not a user content directory, the processor 104 may permit the request to be fulfilled. That is, the processor 104 may permit the file in the upload request 122 to be uploaded to the directory 130a. In other words, the processor 104 may permit the file, which may be an executable file, to be uploaded to the directory 130a based on a determination that the application of the predictive model 110 indicates that the directory 130a is designated to receive executable files, e.g., server-side executable files, from users 120a-120n.

Figure 3:
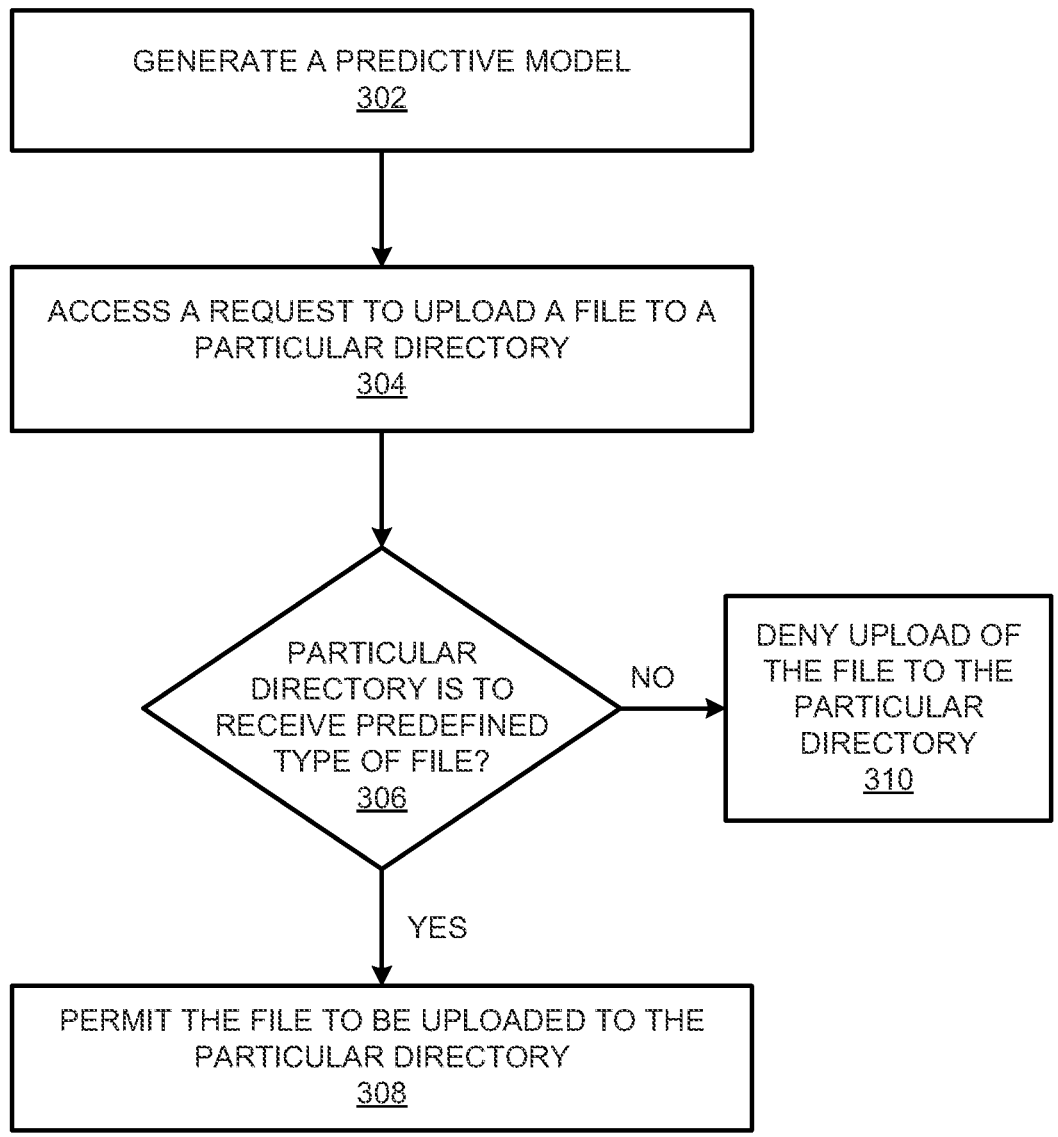
FIG. 3 depicts a flow diagram of a method for applying a predictive model on a particular directory to determine whether the particular directory is to receive a predefined type of file from users, in accordance with an embodiment of the present disclosure.

Various manners in which the processor 104 of the apparatus 102 may operate are discussed in greater detail with respect to the method 300 depicted in FIG. 3. Particularly, FIG. 3 depicts a flow diagram of a method 300 for applying a predictive model on a particular directory 130a to determine whether the particular directory 130a is to receive a predefined type of file from users 120a-120n, in accordance with an embodiment of the present disclosure. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 104 may generate a predictive model 110 using a training set of data, in which the predictive model 110 is to be used to classify directories as being to receive a predefined type of file from users 120a-120n or not being to receive the predefined type of file from users 120a-120n. Particularly, for instance, the processor 104 may access the training set of data, which may include data pertaining to user uploads of multiple types of files to multiple directories. The multiple of types of files may include data files, executable files, server-side executable files, etc. In addition, the training set of data may include manually curated data and/or real world data pertaining to the user uploads of the multiple types of files to directories.

According to examples, the processor 104 may generate the predictive model 110 using a machine learning operation on the training set of data. The processor 104 may employ any suitable machine learning operation on the training set of data to generate the predictive model 110. For instance, the processor 104 may employ a supervised learning algorithm, a recurrent neural network algorithm, bag of words, doc2vec with regression, and/or the like. In any regard, the processor 104 may employ the machine learning operation to identify, for instance, correlations between various features or characteristics of the multiple directories in the training set of data and whether the multiple directories normally received certain types of files, e.g., whether the directories received only data files from users, only executable files from users, or both. The processor 104 may generate the predictive model 110 to model the behaviors of the directories, e.g., whether the directories received executable files or not, based on their features or characteristics.

At block 304, the processor 104 may access a request 122 to upload a file to a particular directory 130a, in which the file is a predefined type of file. The processor 104 may access the upload request 122 by, for instance, receiving the upload request 122 from a user 120a via a network 140. In some examples, the apparatus 102 in which the processor 104 is provided may be a gateway device through which network traffic from the network 140 may be routed. In other examples, the apparatus 102 may be a server that may provide security and/or other services to the directories 130a-130m in a domain 132. In any regard, the processor 104 may receive the upload request 122 prior to the request being submitted to the directory 130a.

At block 306, the processor 104 may apply the predictive model 110 on the particular directory 130a to determine whether the particular directory 130a is to receive the predefined type of file from users 120a-120n. That is, the processor 104 may input features of the particular directory 130a, e.g., file name, URL, or the like, into the predictive model 110 and may apply the predictive model 110 to determine an output as to whether the particular directory 130a is to receive the predefined type of file from users 120a-120n. In some examples, application of the predictive model 110 on the particular directory 130a may result in a determination as to whether the particular directory 130a is a user content directory.

Based on a determination at block 306 that the particular directory 130a is to receive the predefined type of file from users 120a-120n, the processor 104 may, at block 308, permit the file to be uploaded to the particular directory 130a. That is, for instance, based on a determination that the particular directory 130a is not a user content directory, the processor 104 may permit the file, which may be an executable file, to be uploaded to the particular directory 130a. This may include the file being uploaded to the particular directory 130a.

However, based on a determination at block 306 that the particular directory 130a is not to receive the predefined type of file from users 120a-120n, the processor 104 may, at block 310, deny upload of the file to the particular directory 130a. That is, for instance, based on a determination that the particular directory 130a is a user content directory, the processor 104 may not allow the file, which may be an executable file, to be uploaded to the particular directory 130a. In addition, or alternatively, based on a determination at block 306 that the particular directory 130a is not to receive the predefined type of file from users 120a-120n, the processor 104 may output an indication that an attempt was made to upload the file to the particular directory 130a. The processor 104 may output the indication to the user 120a, to an administrator, and/or to file log.

According to examples, the apparatus 102 may be a gateway and thus, the processor 104 of the gateway may access the request 122 to upload the file to particular directory 130a. In addition, the processor of the gateway may deny upload of the file to the particular directory 130a.

In other examples, a gateway may receive the upload request 122 and may forward the upload request 122 to a server. In these examples, the apparatus 102 may be the server, and the processor 104 of the server may receive the upload request 122 from the gateway. In addition, the processor 104 of the server may apply the predictive model 110 on the particular directory 130a to determine whether the particular directory 130a normally receives the predefined type of file from users 120a-120n. Moreover, the gateway may receive, from the server, the determination that the particular directory 130a does not normally receive the predefined type of file from users 120a-120n or the determination that the particular directory 130a does not normally receive the predefined type of file from users 120a-120n.

In some examples, application of the predictive model 110 on the particular directory 130a may not result in an identification of whether the particular directory 130a is to receive the predefined type of file from users 120a-120n. This may occur, for instance, when the input of the features of the particular directory 130a may not result in a determination that exceeds some predetermined level of confidence. In these instances, the processor 104 may default to denial of the upload of the file and may output an indication to an administrator and/or the user 120a that the requested upload 122 has been denied.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
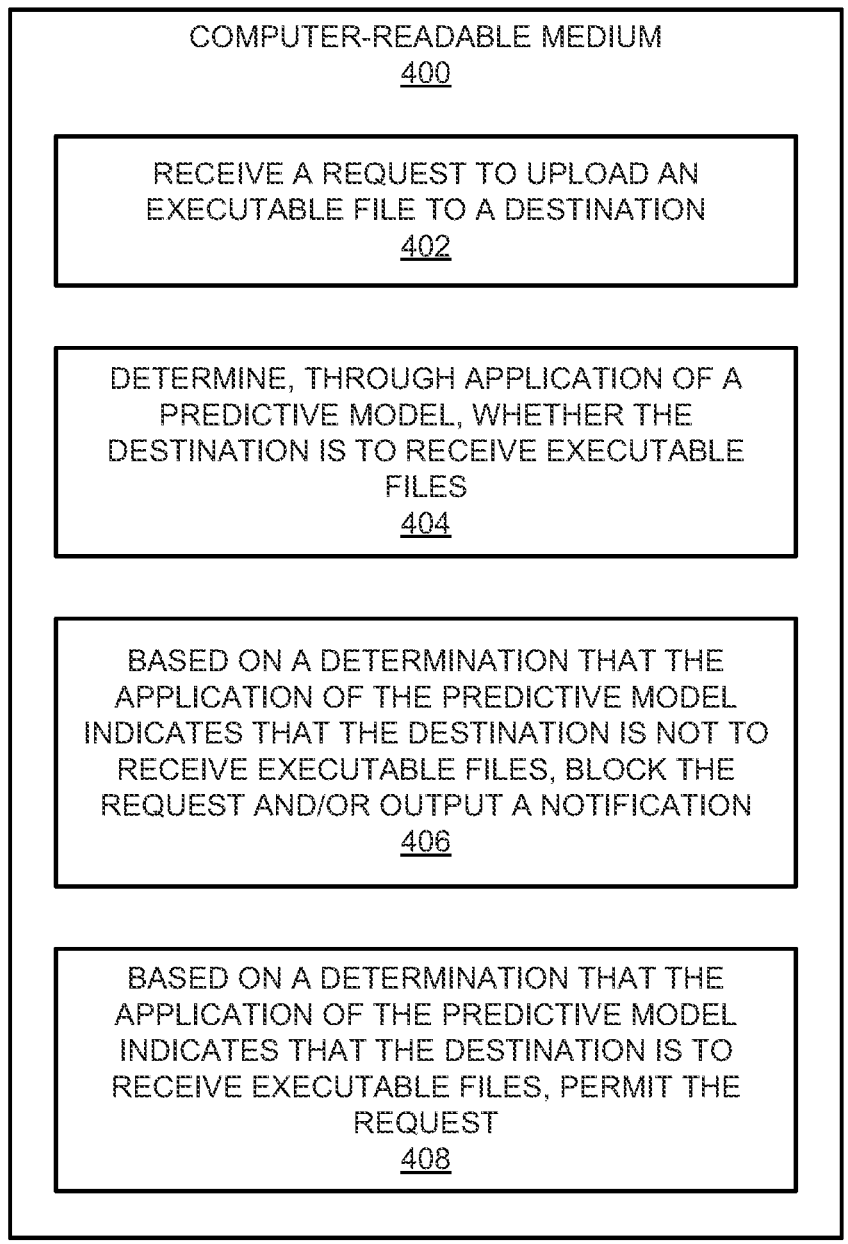
FIG. 4 depicts a block diagram of a computer-readable medium that may have stored thereon computer-readable instructions for determining, through application of a predictive model, whether a destination of an upload request is to receive executable files, in accordance with an embodiment of the present disclosure.

Turning now to FIG. 4, there is shown a block diagram of a computer-readable medium 400 that may have stored thereon computer-readable instructions for determining, through application of a predictive model 110, whether a destination of an upload request 122 is to receive executable files, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium, in which the term "non-transitory" does not encompass transitory propagating signals.

The computer-readable medium 400 may have stored thereon computer-readable instructions 402-408 that a processor, such as the processor 104 depicted in FIGS. 1 and 2, may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to receive a request 122 to upload an executable file to a destination. The executable file may be a file that includes code that a server may execute, e.g., server-side executable code. In addition, the destination may be a directory 130a upon which the file may be uploaded.

The processor may fetch, decode, and execute the instructions 404 to determine, through application of a predictive model 110, whether the destination 130a is to receive executable files. According to examples, the processor may generate the predictive model 110 using a training set of data, in which the training set of data may include data pertaining to user uploads of multiple types of files to destinations. The predictive model 110 may be used to classify destinations as being to receive a predefined type of file from users or not being to receive the predefined type of file from users.

The processor may fetch, decode, and execute the instructions 406 to, based on a determination that the application of the predictive model 110 indicates that the destination 130a is not to receive executable files, block the request 122 and/or output a notification regarding the receipt of the request. However, the processor may fetch, decode, and execute the instructions 408 to, based on a determination that the application of the predictive model 110 indicates that the destination 130a is to receive executable files, permit the upload of the executable file to the destination 130a.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
    a processor; and
    a memory storing instructions that, when executed by the processor, cause the processor to:
        obtain a predictive model generated through implementation of a machine learning operation on a training set of data, the predictive model to be used to classify directories to store specific types of files in the directories;
        receive a request to upload an executable file from a user device to a particular directory of the directories, the executable file being a file that comprises executable code to be executed on a server to perform a service;
        apply the predictive model on an identifier of the particular directory to determine whether the particular directory is a directory that more often than not accepts executable files from user devices;
        in response to a determination that the particular directory is a directory that more often than not accepts executable files from user devices, permit the executable file to be uploaded to the particular directory; and
        in response to a determination that the particular directory is not a directory that more often than not accepts executable files from user devices, deny the request to upload the executable file to the particular directory.

2. The apparatus of claim 1, wherein the instructions cause the processor to:
    in response to the determination that the particular directory is not a directory that more often than not accepts executable files from user devices, output an indication of the receipt of the request.

3. The apparatus of claim 2, wherein the instructions cause the processor to output the indication of the receipt of the request to an administrator.

4. The apparatus of claim 1, wherein the identifier of the particular directory includes a file name of the particular directory.

5. The apparatus of claim 1, wherein the identifier of the particular directory is a uniform resource locator (URL) of the particular directory, and
    wherein, to apply the predictive model on the identifier of the particular directory, the instructions cause the processor to input the URL of the particular directory to the predictive model to determine whether the particular directory is a directory that more often than not accepts executable files from user devices.

6. The apparatus of claim 5, wherein, in addition to inputting the URL of the particular directory to the predictive model, the instructions cause the processor to:
    identify words contained in the particular directory; and
    input the words contained in the particular directory and the URL of the particular directory to the predictive model to determine whether the particular directory is a directory that more often than not accepts executable files from user devices.

7. The apparatus of claim 1, wherein the instructions cause the processor to:
    store the generated predictive model in a data store.

8. A method comprising:
obtaining, by a processor, a predictive model generated through implementation of a machine learning operation on a training set of data, the predictive model to be used to classify directories to store specific types of files in the directories;
receiving, by the processor, a request to upload an executable file from a user device to a particular directory of the directories, wherein the executable file is a file that comprises executable code to be executed on a server to perform a service;
applying, by the processor, the predictive model on an identifier of the particular directory to determine whether the particular directory is a directory that more often than not accepts executable files from user devices;
in response to a determination that the particular directory is a directory that more often than not accepts executable files from user devices, permitting, by the processor, the executable file to be uploaded to the particular directory; and
in response to a determination that the particular directory is not a directory that more often than not accepts executable files from user devices, denying, by the processor, the request to upload the executable file to the particular directory.

9. The method of claim 8, further comprising:
in response to the determination that the particular directory is not a directory that more often than not accepts executable files from user devices, outputting an indication of the receipt of the request.

10. The method of claim 9, further comprising:
outputting the indication of the receipt of the request to an administrator.

11. The method of claim 8, wherein the identifier of the particular directory includes a file name of the particular directory.

12. The method of claim 8, wherein the identifier of the particular directory is a uniform resource locator (URL) of the particular directory, and
wherein applying the predictive model on the identifier of the particular directory includes inputting the URL of the particular directory to the predictive model to determine whether the particular directory is a directory that more often than not accepts executable files from user devices.

13. The method of claim 12, in addition to inputting the URL of the particular directory to the predictive model, the method further comprises:
identifying words contained in the particular directory; and
inputting the words contained in the particular directory and the URL of the particular directory to the predictive model to determine whether the particular directory is a directory that more often than not accepts executable files from user devices.

14. The method of claim 8, further comprising:
storing the generated predictive model in a data store.

15. The method of claim 8, further comprising:
forwarding the request to upload the executable file to the server, wherein the server is to apply the predictive model on the identifier of the particular directory to determine whether the particular directory is a directory that more often than not accepts executable files from user devices; and
receiving, from the server, the determination that the particular directory is not a directory that more often than not accepts executable files from user devices.

16. A non-transitory computer-readable medium storing instructions that when executed by a processor cause the processor to:
obtain a predictive model generated through an implementation of a machine learning operation on a training set of data, the predictive model to be used to classify directories to store specific types of files in the directories;
receive a request, from a user device, to upload an executable file from the user device to a particular directory of the directories, wherein the executable file is a file that comprises executable code to be executed on a server to perform a service;
apply the predictive model on an identifier of the particular directory to determine whether the particular directory is a directory that more often than not accepts executable files from user devices;
in response to a determination that the particular directory is a directory that more often than not accepts executable files from user devices, permit the executable file to be uploaded to the particular directory; and
in response to a determination that the particular directory is not a directory that more often than not accepts executable files from user devices, deny the request to upload the executable file to the particular directory.

17. The non-transitory computer-readable medium of claim 16, wherein the instructions cause the processor to:
in response to the determination that the particular directory is not a directory that more often than not accepts executable files from user devices, output an indication of the receipt of the request.

18. The non-transitory computer-readable medium of claim 17, wherein the instructions cause the processor to output the indication of the receipt of the request to an administrator.

19. The non-transitory computer-readable medium of claim 16, wherein the identifier of the particular directory is a uniform resource locator (URL) of the particular directory, and
wherein the instructions cause the processor to input the URL of the particular directory to the predictive model to determine whether the particular directory is a directory that more often than not accepts executable files from user devices.

20. The non-transitory computer-readable medium of claim 19, wherein, in addition to inputting the URL of the particular directory to the predictive model, the instructions cause the processor to:
identify words contained in the particular directory; and
input the words contained in the particular directory and the URL of the particular directory to the predictive model to determine whether the particular directory is a directory that more often than not accepts executable files from user devices.

\* \* \* \* \*